United States Patent
Dosluoglu et al.

(10) Patent No.: US 9,515,553 B2
(45) Date of Patent: Dec. 6, 2016

(54) TRANSIENT POWER CONTROL

(71) Applicants: Taner Dosluoglu, New York, NY (US); Hassan Ihs, Vendargues (FR)

(72) Inventors: Taner Dosluoglu, New York, NY (US); Hassan Ihs, Vendargues (FR)

(73) Assignee: Endura Technologies LLC, San Diego, CA (US)

( * ) Notice: Subject to any disclaimer, the term of this patent is extended or adjusted under 35 U.S.C. 154(b) by 95 days.

(21) Appl. No.: 14/602,112

(22) Filed: Jan. 21, 2015

(65) Prior Publication Data

US 2015/0364994 A1    Dec. 17, 2015

Related U.S. Application Data

(60) Provisional application No. 62/012,909, filed on Jun. 16, 2014, provisional application No. 62/013,460, filed on Jun. 17, 2014, provisional application No. 62/086,027, filed on Dec. 1, 2014.

(51) Int. Cl.
  *H02M 3/158* (2006.01)
  *H02M 1/36* (2007.01)
  *H02M 3/156* (2006.01)

(52) U.S. Cl.
  CPC .............. *H02M 3/158* (2013.01); *H02M 1/36* (2013.01); *H02M 2003/1566* (2013.01)

(58) Field of Classification Search
  CPC ......... H03K 5/025; H03K 5/023; H03K 5/04
  USPC ................... 327/306–307, 309–311
  See application file for complete search history.

(56) References Cited

U.S. PATENT DOCUMENTS

| | | |
|---|---|---|
| 6,028,417 A | 2/2000 | Ang et al. |
| 6,137,274 A | 10/2000 | Rajagopalan |
| 6,246,222 B1 | 6/2001 | Nilles et al. |
| 7,701,190 B2 | 4/2010 | Chen et al. |
| 8,378,650 B2 | 2/2013 | Maher |
| 8,513,933 B2 | 8/2013 | Notman et al. |
| 8,571,492 B2 | 10/2013 | Berchtold et al. |
| 8,710,810 B1 | 4/2014 | McJimsey et al. |
| 2012/0163039 A1 | 6/2012 | Halberstadt |

(Continued)

FOREIGN PATENT DOCUMENTS

| | | |
|---|---|---|
| JP | 2009-100602 A | 5/2009 |
| JP | 2010-141974 A | 6/2010 |
| WO | WO 01-59917 A1 | 8/2001 |

OTHER PUBLICATIONS

International Search Report on related PCT Application No. PCT/US2015/036103 from International Searching Authority (KIPO) dated Aug. 28, 2015.
Written Opinion on related PCT Application No. PCT/US2015/036103 from International Searching Authority (KIPO) dated Aug. 28, 2015.

(Continued)

*Primary Examiner* — Lincoln Donovan
*Assistant Examiner* — Diana J Cheng
(74) *Attorney, Agent, or Firm* — Klein, O'Neill & Singh, LLP

(57) ABSTRACT

Automatic transient control circuitry may be used to alleviate issues relating to large changes in power demands by a load in an integrated circuit. The transient control circuitry may inject current to or retract current from a load, for example charging or discharging a bypass capacitor associated with the load, when circuitry of the load is commanded to an operational state from a standby state or vice-versa, respectively.

33 Claims, 8 Drawing Sheets

(56) References Cited

U.S. PATENT DOCUMENTS

2012/0319484 A1* 12/2012 Scaldaferri ............... H02J 1/10
                                                    307/52
2013/0235621 A1   9/2013  Yan et al.

OTHER PUBLICATIONS

J.R. Lee et al., "Modeling and Simulation of Spacecraft Power Systems", IEEE Transactions on Aerospace and Electronic Systems, May 1988, vol. 24, No. 3, pp. 295-304.

* cited by examiner

1

TRANSIENT POWER CONTROL

CROSS REFERENCE TO RELATED APPLICATIONS

This application claims the benefit of the filing date of (a) U.S. Provisional Patent Application No. 62/012,909, filed on Jun. 16, 2014, (b) U.S. Provisional Patent Application No. 62/013,460, filed on Jun. 17, 2014, and (c) U.S. Provisional Patent Application No. 62/086,027, filed on Dec. 1, 2014, the disclosures of which are incorporated by reference herein.

BACKGROUND OF THE INVENTION

The present invention relates generally to power regulation for integrated circuits, and more particularly to control of transients in power provided to integrated circuits.

Integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times.

Further complicating matters, some devices may be powered by batteries having relatively small capacities, while the devices themselves, at least at various times, may require large amounts of power. In such devices it may be beneficial to provide power only when needed, for example in order to lengthen effective battery life between charging. Unfortunately, the devices may quickly transition between a state requiring very little power to a state requiring large amounts of power. In such circumstances, a sudden change in magnitude of a signal on a line or wire through which power is provided may result in transient effects that cause the provision of power outside the parameters required for, or desired for, proper operation of an integrated circuit or device.

BRIEF SUMMARY OF THE INVENTION

Some embodiments in accordance with aspects of the invention provide a DC-DC switching converter that includes a transient control circuit. In some embodiments in accordance with aspects the transient control circuit is an active circuit.

In some embodiments the transient control circuit allows for provision of power to a load in a ramped manner during a period in which power is to be increased, or reduction in power to the load in a ramped manner during a period in which power is to be decreased to the load. In some embodiments the period is a single period, or less than a single period, of the switching converter.

In some embodiments the provision of power to the load in a ramped manner comprises provision of power to the load in a step-wise manner. In some embodiments provision of power to the load in a step-wise manner comprises provision of power at a plurality of substantially discrete different levels. In some embodiments provision of power at a particular level is determined based on one or more comparisons of a signal provided to the load with pre-defined levels. In some embodiments the signal is a voltage signal. In some embodiments the period is at a start-up period of provision of power to the load. In some embodiments the period is a period in which power to a load is to be increased by a predetermined amount greater than power currently provided to the load. In some embodiments the predetermined amount is based on an amount of power currently provided to the load. In some embodiments power is provided to the transient control circuit, and hence the load, from a battery, or from a system-on-chip power signal. In some embodiments, during the start-up period current is provided through a plurality of paths, each coupled either to the load or to ground, with each path selectively coupled to the load based on comparisons of a signal provided to the load with pre-defined levels.

In some embodiments the reduction of power to the load in a ramped manner comprises reducing of power to the load in a step-wise manner. In some embodiments reduction of power to the load in a step-wise manner comprises reduction of power at a plurality of substantially discrete different levels. In some embodiments reduction of power at a particular level is determined based on one or more comparisons of a signal provided to the load with pre-defined levels. In some embodiments the signal is a voltage signal. In some embodiments the period is at a shutdown period of provision of power to the load. In some embodiments the period is a period in which power to the load is to be decreased by a predetermined amount less than power currently provided to the load. In some embodiments the predetermined amount is based on an amount of power currently provided to the load. In some embodiments, during the shutdown period current is pulled through a plurality of paths, each coupling the load and to ground, with each path selectively coupled the load to ground based on comparisons of a signal provided to the load with pre-defined levels.

In some embodiments voltage across a capacitor is regulated by a DC-DC converter and several power domains are connected to the capacitor, for example in a star connection. Each power domain may have a small bypass capacitor, for example an integrated decoupling capacitor, adjacent to the power domain on the same silicon. In various embodiments the bypass capacitor may be a metal-insulator-metal (MIM) capacitor, a metal-oxide-metal (MOM) capacitor, or integrated capacitor otherwise formed. The power routing between the capacitor being regulated and the power domain capacitors, which might include package pins, may have enough parasitic inductance to cause oscillations when the power is increased or decreased significantly within several clocks of the SoC, which is typically 1 or 2 GHZ (1 nanosecond or 500 picoseconds). In some embodiments passive supply of current from the regulated capacitor to the capacitors of power domains are aided with an active control circuit that sources or sinks current in a step-wise manner, for example causing provision of power at a plurality of substantially discrete different levels. In some embodiments provision of power at a particular level is determined based on one or more comparisons of a signal provided to the load with pre-defined levels. In some embodiments the signal is a voltage signal.

In some embodiments the active control circuit sources current during the startup period, keeping the voltage difference between the capacitor of the power domain and the regulated capacitor relatively constant (typically within −50 mV), which results in linear increase of the current across the parasitic inductor with minimum passive oscillations.

In some embodiments the power being delivered to the power domain is desired to be shut down, and the active control circuit sinks current during a shutdown operation. This is preferably accomplished in a manner to keep the voltage difference between the capacitor of the power domain and the regulated capacitor relatively constant (typically within +50 mV), which results in linear decrease of the current across the parasitic inductor with minimum passive oscillations In some embodiments the transient control circuit instead or in addition includes a gate coupled across nodes of an inductor forming part of the DC-DC switching converter. In some embodiments the gate allows for passage of current. In some embodiments the gate allows for passage of current during a start-up period of provision of power to a load.

In some embodiments the DC-DC switching converter includes an inductor and a capacitor, with provision of power from a node between the inductor and the capacitor. In some such embodiments the transient control circuit includes a gate coupled across nodes of the inductor, and ramping start-up circuitry to provide current to a load in a ramped manner during a start-up period for the load.

Some embodiments in accordance with aspects of the invention include power supply circuitry for a system-on-chip, with the power supply circuitry including a plurality of DC-DC switching converters each including a capacitance and an inductance, and transient control circuitry for at least a plurality of the DC-DC switching converters.

Some embodiments in accordance with aspects of the invention provide a method useful in control of power to a power domain of an integrated circuit, comprising: determining if circuitry of a power domain is to transition from a standby low power state to an operational state; if the circuitry is to transition from the standby low power state to the operational state: providing power from a first power source to the circuitry of the power domain using a DC-DC switching converter, and providing current from a second power source to the circuitry of the power domain on at least one selectable path.

Some embodiments in accordance with aspects of the invention provide a method useful in control of power to a power domain of an integrated circuit, comprising: determining if circuitry of a power domain is to transition from an operational state to a standby low power state; if the circuitry is to transition from the operation state to the standby low power state: drawing current from a node used to provide power to the circuitry of the power domain on at least one selectable path.

Some embodiments in accordance with aspects of the invention provide circuitry useful in controlling transients in a power distribution system, comprising: a DC-DC switching converter coupled to a node for applying voltage to a power domain load; and a digitally controlled current source coupled to the node for applying voltage to the power domain load, in parallel with the DC-DC switching converter.

Some embodiments in accordance with aspects of the invention provide a system with a power transient control circuitry comprising: a first switch and a second switch coupled in series between a higher power source and lower power source; an inductor having one end coupled between the first and second switch and another end coupled to a capacitor and a power load in parallel; and a first plurality of paths selectively couplable between the higher power source and the power load, each of the first plurality of paths having a switch for selectively coupling the path between the higher power source and the power load.

These and other aspects of the invention are more fully comprehended upon review of this disclosure.

DETAILED DESCRIPTION

Figure 1:
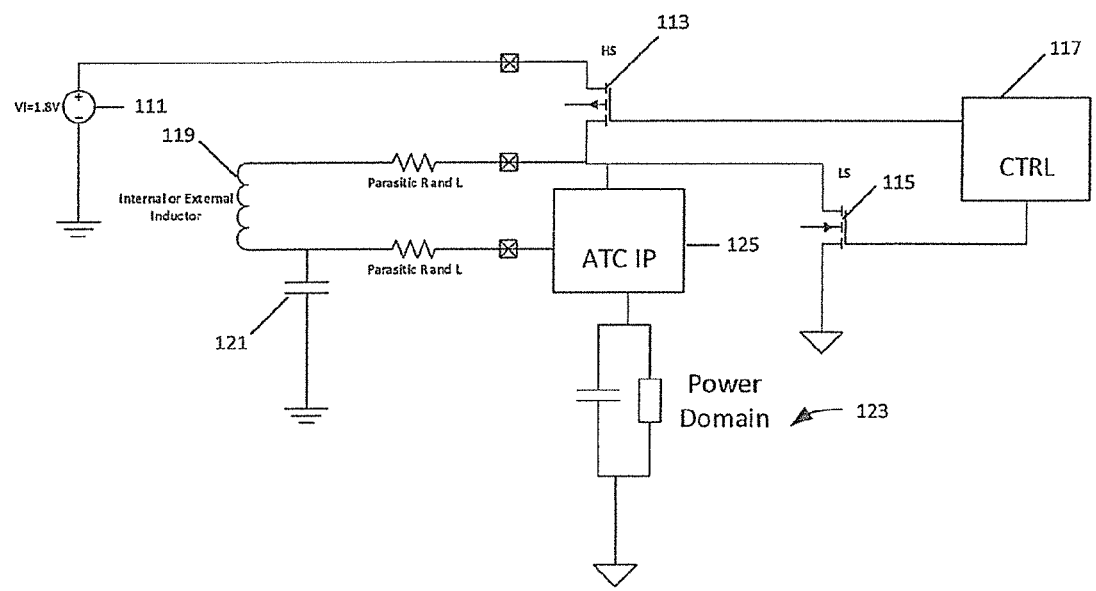
FIG. 1 is a semi-schematic, semi-block diagram of a system including power transient control circuitry in accordance with aspects of the invention.

FIG. 1 is a semi-schematic, semi-block diagram including circuitry in accordance with aspects of the invention. As shown in FIG. 1, a power source 111 provides power to a DC-DC switching converter. The DC-DC switching converter includes a push-pull switch including a high side switch 113 and a low side switch 115 in series between the power source and a ground. A first node of an inductor 119 is coupled between the high side switch and the low side switch, with a second node of the inductor coupled by way of a capacitor 121 to ground.

The high side switch and the low side switch are generally controlled in a synchronous manner by control circuitry 117. The control circuitry generally controls the switches based on various feedback signals, for example a signal indicative of inductor current, a signal indicative of voltage at a node between the capacitor and the inductor, and various other signals. In general, the control circuitry controls the switches to obtain a desired voltage at the node between the inductor and the capacitor, generally the capacitor voltage. The capacitor voltage is generally used to provide power to a load, which may be multiple loads, in a power domain 123.

In some embodiments some or all of the power source, inductor, and capacitor are located off of a semiconductor die with the semiconductor die including the load, with the other components on the semiconductor die.

An active transient control block 125 includes circuitry for controlling transients in power supplied to the power domain. The active transient control block 125 allows for passage of power from the power source, or some other power source in some embodiments, to the power domain. In various embodiments an on-chip capacitor, or multiple on-chip capacitors, may be provided in parallel in parallel to the power domain or load. In some embodiments the active transient control block provides current to an on-chip capacitor in parallel to the load. In some embodiments the active transient control block may provide current to capacitors, for example in-package but not on-chip capacitors, in a power delivery network between the generally off-chip and possible off-package capacitor of the DC-DC converter. In some embodiments this may be selectively accomplished through use of a switch, which may be selectively enabled by the control 117 or otherwise, coupling the active transient control block of the in-package capacitors. In addition, in various embodiments the active transient control block allows for passage of power from the capacitor to the power domain. In addition, in some embodiments the active transient control block is coupled to both nodes of the inductor. In some embodiments the active transient control block limits the current delivered from the capacitor to the power domain by delivering additional current during abrupt increases in power demand by the elements in the power domain. In some embodiments the active transient control block limits the current between the capacitor and the power domain by sinking current during abrupt decreases in power demand by the elements in the power domain.

As illustrated in FIG. 1, the active transient control block is coupled to a node between the high side switch and the inductor, and couples that node to the power domain. The active transient control block therefore allows coupling of the power domain to the power source, through for example the high side switch. In some embodiments the active transient control block may be coupled to the power source, or some other power source, through some other coupling.

In some embodiments, and as illustrated in FIG. 1, the active transient control block is also coupled to the second node of the inductor and to the power domain, with the active transient control block coupling the power domain to the second node of the inductor, and hence the capacitor.

In some embodiments the active transient control block includes circuitry for providing power to the power domain from the power source, preferably in a controlled ramping manner, during predefined operational conditions. For example, in some embodiments, when the power domain requires a large increase in supplied power, the active transient control block may allow, over a period of time, increasing amounts of power to be supplied from the power source to the power domain.

In some embodiments this may be accomplished by providing a plurality of parallel signal paths from the power source to the power domain, each of the paths being able to pass discrete amounts of power to the power domain. Differing numbers of paths, or different paths allowing for passage of differing amounts of power to the power domain, may be activated at different times during the period of time. The period of time may be relatively short, for example, limited to nominally a cycle of a switching power duty cycle. In some embodiments selection of which paths to activate, and in some embodiments when to activate the paths, may be made based on magnitude of voltage at an input to the power domain. In some embodiments the magnitude of the voltage may be determined by use of comparators, which preferably are relatively fast acting comparators. In some embodiments each of the paths may include an output branch coupled to the power domain and another output branch coupled to a ground. During times when any of the paths are to be activated, or may be activated, power may be passed through all of the paths, selectively either to the power domain or to the ground, or to both. Such a configuration, which may be implemented for example using current mirrors, may allow for decreased activation time when power is desired to be passed through a particular path to the power domain, and/or may provide possible reduction of voltage drops across parasitic inductances in a supply path from the power source to the active transient control block.

Such operation may considered a fast start-up mode, and may be active or triggered when there is a large negative internal node voltage error, for example when voltage supplied to the power domain is lower than a predefined magnitude. Such an occurrence may occur due to fast start-up which causes the voltage to fall below a threshold during the first time when the high side switch is on following a standby mode for the power domain. In some embodiments activation of the fast start-up mode occurs only upon an exit from standby mode for the power domain, or a transition from a standby mode to an on or start mode, or either or both and a large negative internal node voltage error. In various embodiments the fast start-up mode may end when either or both the low voltage error condition is no longer true or after a first cycle of DC-DC converter operation, which may be for example 18 nsec for a switching converter using an inductor of 10 nH.

In some embodiments the active transient control block is in standby mode when the DC-DC converter is in STANDBY mode. The active transient control circuitry may be powered up when the DC-DC high side switch turns on when voltage across the external capacitor is below the preset threshold (typically −1%) and provides start-up transient control if enabled by a second threshold. Active transient startup control may be enabled when the internal node voltage falls below a second preset threshold (typically −2%), with the active transient control block then delivering additional current. In some embodiments this can be implemented as digitally controlled current source (for example 5 to 10 current mirrors that are enabled/disabled depending on a level of the internal node voltage). The power may only be provided, and the active transient control block circuitry for providing the current may only be active, during a first cycle of the switching converter when the high side switch is on. The duration and magnitude of the current may depend on a ramp rate and final value of the load current, which may not be known but the number of current mirrors enabled based on the internal node voltage error can be used to estimate the load current. This in itself provides useful information regarding the load current without a need for additional monitoring other than the voltage. The circuit deactivates itself and the deactivation signal can be used to start the normal operation of the DC-DC controller which remains in power switch ON mode until active transient start-up is deactivated. In some embodiments the number of current mirrors activated can also be used to determine whether the DC-DC converter should immediately follow in PWM mode or provide single pulse and return to standby.

In addition, in some embodiments, the active transient control block also isolates the power domain from the capacitor during fast start-up mode. In such instances, in some embodiments the active transient control block may also couple the first node and the second node of the inductor, for example so as to effectively short the two ends of the inductor. In some embodiments the active transient control block may couple the inductor nodes using a one-way switch.

In some embodiments the active transient control block also includes circuitry for implementing a forced standby mode. In some embodiments the active transient control circuitry may couple the two inductor nodes, effectively shorting them, in some embodiments using a one way switch. Forced standby mode may be active when there is a large positive voltage error on the capacitor; for example due to large inductor current that could not be handled by the DC-DC control (or somehow was not handled). In some embodiments forced standby conditions are continuously monitored, and reset when the error condition is eliminated. During forced standby the DC-DC high side switch and low side switch control signals may be determined, but the control signals disabled, for example based on a control signal from the active transient control block. In some embodiments the forced standby mode inductor current is monitored, with the mode ending when the current is below a preset threshold. The capacitor voltage may also be monitored, and if the capacitor voltage error falls below threshold (typically +1%) the forced standby mode additionally or alternatively ends.

Accordingly, in some embodiments during forced standby both the high side and low side switches are off. In some embodiments, unlike fast start-up mode, the forced standby functionality is not limited to a specific period and would be engaged every time the voltage error across the external capacitor is above 2% threshold. In some embodiments forced standby mode may be exited if either (or both, in some embodiments) the voltage error across the external capacitor is below the preset threshold or the voltage across the connections to the inductor nodes falls below a certain threshold as this is an indication of small inductor current. When reset ATC returns to the same mode as DC-DC controller (Active or Standby).

Figure 2:
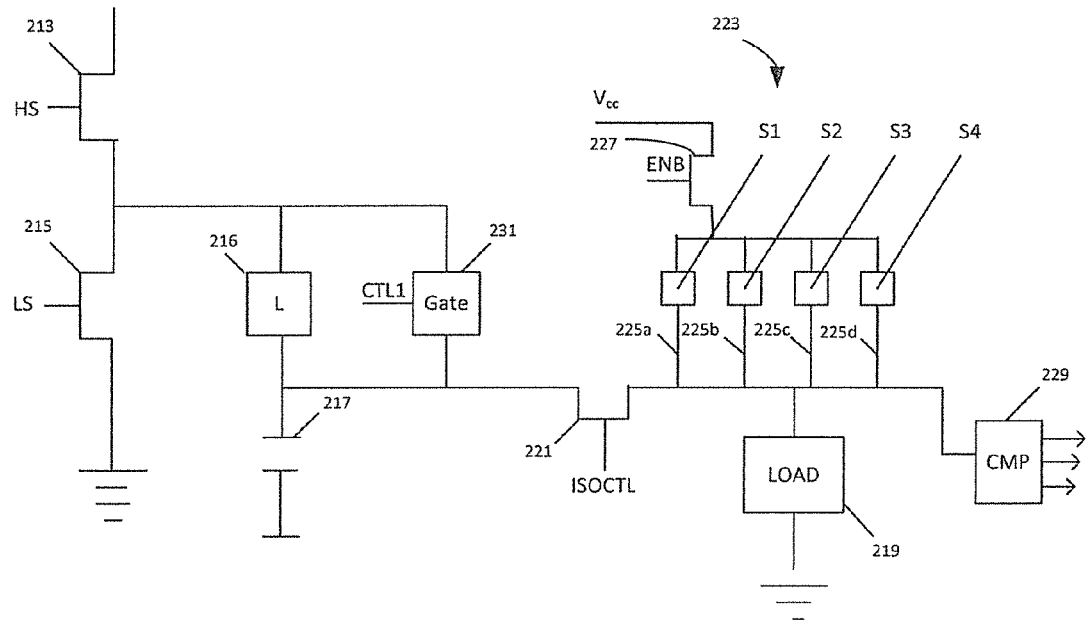
FIG. 2 is a semi-schematic, semi-block diagram showing portions of embodiments of power transient circuits in accordance with aspects of the invention.

FIG. 2 is a semi-schematic, semi-block diagram showing portions of an embodiment of an active transient control block, which in some embodiments may be part of the active transient control block of FIG. 1. For clarity, FIG. 2 also shows a high side switch 213, low side switch 215, inductor 216, and capacitor 217 of a DC-DC converter, and a load 219. Similar to the discussion with respect to FIG. 1, the high side switch and the low side switch are coupled in series between a power source and a ground, with the power source coupled to the high side switch and the ground coupled to the low side switch. A first node of the inductor is coupled to a node between the high side switch and the low side switch, and a second node of the inductor is coupled to a ground by way of the capacitor. The DC-DC converter supplies power from a node between the inductor and the capacitor. Depending on a type of converter used, and implementation details, one of skill in the art may recognize that other configurations may instead be used.

An isolation switch 221 separates the capacitor and the load, with the isolation switch serving to isolate the load from the DC-DC converter based on an isolation control signal ISOCTL. ISOCTL may be set by a controller, for example an active transient control controller, a DC-DC converter control, or a system-on-chip (SOC) signal, depending on implementation.

The active transient control block includes fast start up circuitry 223. In the embodiment of FIG. 2, the fast startup circuitry provides a plurality of paths 225a-d between an SOC power supply Vcc and the load. In some embodiments, however, the plurality of paths 225a-d provide paths between a line coupled to a node, the node between the high side switch and the low side switch (which may be termed an inductor switching node), and the load. In such embodiments, in most cases, a switch will couple the paths to the node, and in some embodiments the switch may be part of a bypass switch, discussed later with respect to gate 231 of FIG. 2. In such instances the bypass switch may include multiple branches. With respect to the paths, each of the paths includes a switch S1-S4 for activating the path. In addition, in the embodiment of FIG. 2, an enable switch 227 is between the SOC power supply and the paths, such that none of the paths receives power unless the enable switch is turned on. In addition to or instead of any other control of the enable switch discussed herein, in some embodiments the enable switch is maintained in an off state if a digital voltage frequency scaling governor or similar circuitry is operating the power domain at a low frequency, or a frequency below a predetermined frequency. Similarly, in some such embodiments, other or all of the ATC circuitry is maintained in an unpowered state in such a situation.

The active transient control block also includes one or more comparators 229 for comparing voltage provided to the load with predetermined values, which in some embodiments are programmable, for example by way of register settings or otherwise. In some embodiments the comparators may instead compare voltage of an output capacitor of the DC-DC converter, and in some embodiments the comparators may be external to the active transient control block. In some embodiments the predetermined values are representative of voltages within predefined amounts of a desired output voltage. In some embodiments the desired output voltage may be determined or provided by a controller, for example the controller 117 of FIG. 1. In some embodiments the comparators determine a magnitude of a negative voltage error in voltage applied to the load.

In operation, in some embodiments, upon entry into a fast startup mode, the enable switch is turned on, as are, on a sequential basis in some embodiments, a plurality of the paths, through activation of their activation switches. In some embodiments, the plurality of paths are activated based on a magnitude of a negative voltage error in voltage applied to the load, with increased number of paths activated with increasing negative magnitude of error. In some embodiments the plurality of paths are activated based on the magnitude of the negative voltage error, with paths activated to provide desired current to the load. In some embodiments the isolation switch is also set to isolate the load from the DC-DC converter during fast startup mode. In many embodiments, however, during fast start-up the isolation switch is set to not isolate the load from the capacitor so as to provide current from the capacitor while inductor current is ramping up.

Generally, on exit of fast startup mode the enable switch is set low, the path switches are set low, and the isolation switch is set to not isolate the load from the DC-DC converter.

In addition, in some embodiments, and as illustrated in FIG. 2, a gate 231 is provided to selectively couple ends of the inductor. The gate 231 may be considered to place the DC-DC converter in a bypass mode, and the gate 231 may therefore be considered in some embodiments a bypass switch. In some embodiments the gate 231 is turned on during fast startup mode, but in most embodiments during fast startup mode typically gate 231 is turned off, the high side switch is turned on (with the low side switch turned off) and the current of the inductor is ramping. In addition, in some embodiments the gate is turned on in fast shutdown mode, and/or in some embodiments the gate is turned on when an indication of inductor current is significantly greater, or greater than a predetermined amount or factor, than a desired load current.

One version of the fast startup circuitry is implemented with six paths, a current mirror for each path. Each path may be activated using preset thresholds as summarized in the table below. In some embodiments the fast startup circuitry is only activated during a first high side switch on pulse and there is an automatic deactivation when the voltage applied to the load returns to a regulation range (e.g. below smallest threshold).

| Number of Current Mirrors ENABLED | IntVO activation threshold |
|---|---|
| 0 | +/−1% |
| 1 | −1% error |
| 2 | −2% error |
| 3 | −3% error |
| 4 | −4% error |
| 5 | −5% error |
| 6 | −6% error |

In various embodiments outputs of the comparators 229 are used to determine the number of current mirrors enabled. In various embodiments outputs of the comparators are used to determine an index to a look-up table (LUT), with the LUT indicating a number of current mirrors to enable. In some embodiments a plurality of LUTs may be used, and different LUTs may indicate a different number and/or different ones of the current mirrors enabled. In some such embodiments use of a particular LUT may be selected based on a rate of change of power available to the load with respect to desired power available to the load, for example as indicated by rate of change of negative voltage errors. For example, different LUTs may be used depending on whether the negative voltage error is rapidly increasing, rapidly decreasing, or neither rapidly increasing or rapidly decreasing.

Figure 6:
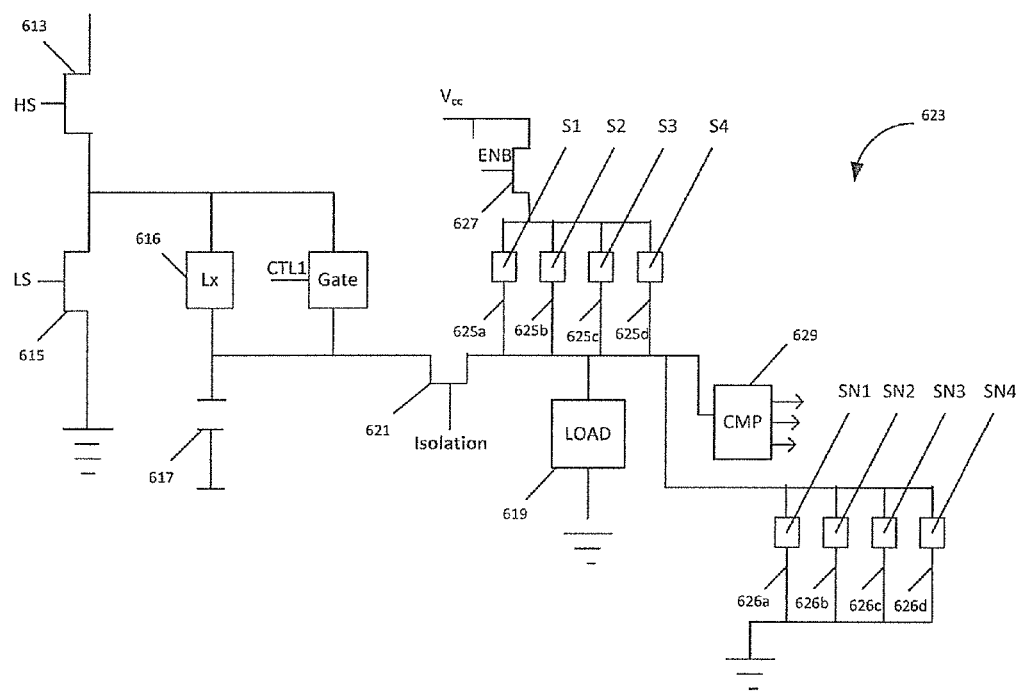
FIG. 6 is a semi-schematic, semi-block diagram showing portions of further power transient control circuitry in accordance with aspects of the invention.

FIG. 6 is a semi-schematic of a further embodiment of portions of an active transient control block in accordance with aspects of the invention, and in some embodiments may serve as the active transient control block of the embodiment of FIG. 1. As with FIG. 2, for clarity FIG. 6 also shows a high side switch 613, low side switch 615, inductor 616, and capacitor 617 of a DC-DC converter, and a load 619. The active transient control block also includes one or more comparators 629 for comparing voltage provided to the load with predetermined values, which in some embodiments are programmable, for example by way of register settings or otherwise.

Similar to the discussion with respect to FIG. 1, the high side switch and the low side switch are coupled in series between a power source and a ground, with the power source coupled to the high side switch and the ground coupled to the low side switch. A first node of the inductor is coupled to a node between the high side switch and the low side switch, and a second node of the inductor is coupled to a ground by way of the capacitor. The DC-DC converter supplies power from a node between the inductor and the capacitor. Also as in FIG. 2, in FIG. 3 an isolation switch 621 separates the capacitor and the load, with the isolation switch serving to isolate the load from the DC-DC converter based on an isolation control signal ISOCTL. ISOCTL may be set by a controller, for example an active transient control controller, a DC-DC converter control, or a system-on-chip (SOC) signal, depending on implementation.

The active transient control block includes fast startup/fast shutdown circuitry 623. In the embodiment of FIG. 6, the fast startup/shutdown circuitry provides a first plurality of paths 625a-d between an SOC power supply Vcc and the load, and a second plurality of paths 626a-d between a node, between the first plurality of paths and the load, and a ground. Each of the first paths includes a switch S1-S4 for activating the path, and each of the second paths include a switch SN1-SN4 for activating the path. In addition, in the embodiment of FIG. 6, an enable switch 627 is between the SOC power supply and the first paths, such that none of the first paths receives power unless the enable switch is turned on. As discussed with respect to the enable switch 227 of FIG. 2, if a DVFS governor or similar circuitry is operating the power domain load at a low power, low frequency condition, the enable switch may be kept in an off state. In addition, in some embodiments a further enable switch (not shown) may be provided between the second paths and ground, such that none of the second paths sink power unless the further enable switch is turned on.

The fast startup/shutdown circuitry may be operated as discussed with respect to FIG. 2 in order to provide a fast startup mode. In addition, in some embodiments the second paths may used to provide a fast shutdown mode. For example, in some embodiments selected ones, or all, of the second paths are activated when the comparators indicate a large positive voltage error in voltage applied to the load, with for example paths activated so as to sink increasing amounts of current for increasing large positive voltage errors. Such a circumstance may occur, for example, when the load is commanded to be off, for example based on a command generated elsewhere on a SOC. In some embodiments, during fast shutdown the isolation switch may be maintained in an on state for a switching cycle period of the converter.

Figure 3A:
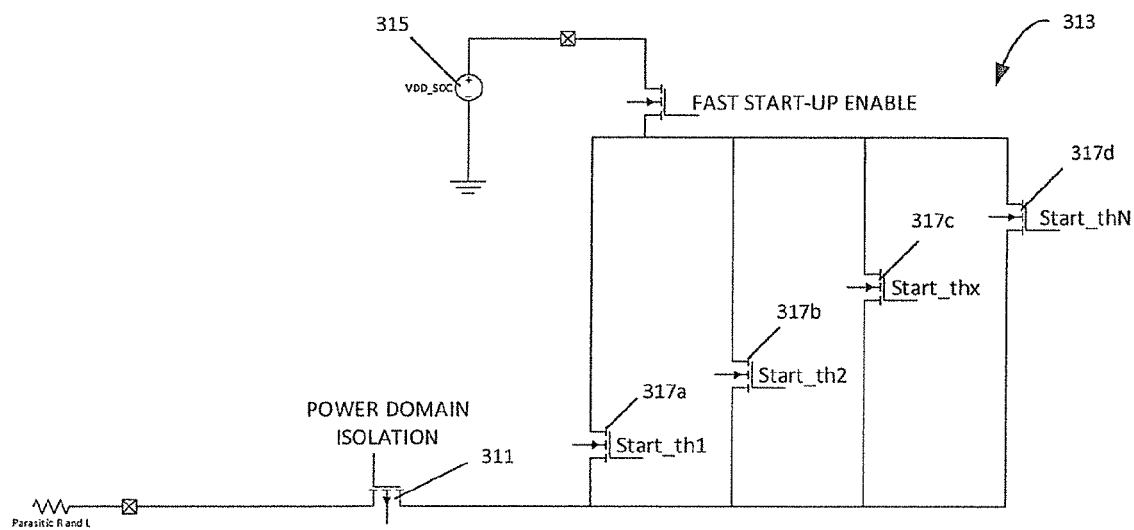
FIG. 3A is a semi-schematic, semi-block diagram showing portions of a further embodiment of power transient circuits in accordance with aspects of the invention.

FIG. 3A is a semi-schematic of a further embodiment of portions of an active transient control block in accordance with aspects of the invention, and in some embodiments may serve, or portions may serve, as the active transient control block of the embodiment of FIG. 1.

In the embodiment of FIG. 3A, a power domain isolation switch links fast startup circuitry 313 to a DC-DC converter (not shown in FIG. 3A). The fast startup circuitry couples a power source 315, VDD_SOC in this example, to a load (not shown in FIG. 3A). The fast startup circuitry includes an enable switch 317 coupling the power source to a plurality of paths 1-N. Each of the paths may be implemented as discussed herein. In operation, during a fast startup mode, a first path is activated using a control switch 317a at a first threshold of negative error in voltage applied to the load, a second path is activated using a control switch 317b at a second threshold of negative error in voltage applied to the load, . . . , an xth path is activated using a control switch 317c at an xth threshold of negative error in voltage applied to the load, . . . , and an Nth path is activated using a control switch 317d at an Nth threshold of negative error in voltage applied to the load.

One version of the fast shutdown circuitry is implemented with six paths, a current mirror for each path. Each path may be activated using preset thresholds as summarized in the table below. In some embodiments the fast shutdown circuitry is only activated when SOC signal to isolate power domain is received and there is an automatic deactivation when the voltage applied to the load returns to a regulation range (e.g. below smallest threshold) or after a fixed period typically the same as a single cycle of switching regulator.

| Number of Current Mirrors ENABLED | IntVO activation threshold |
|---|---|
| 0 | +/−1% |
| 1 | +1% error |
| 2 | +2% error |
| 3 | +3% error |
| 4 | +4% error |
| 5 | +5% error |
| 6 | +6% error |

Figure 3B:
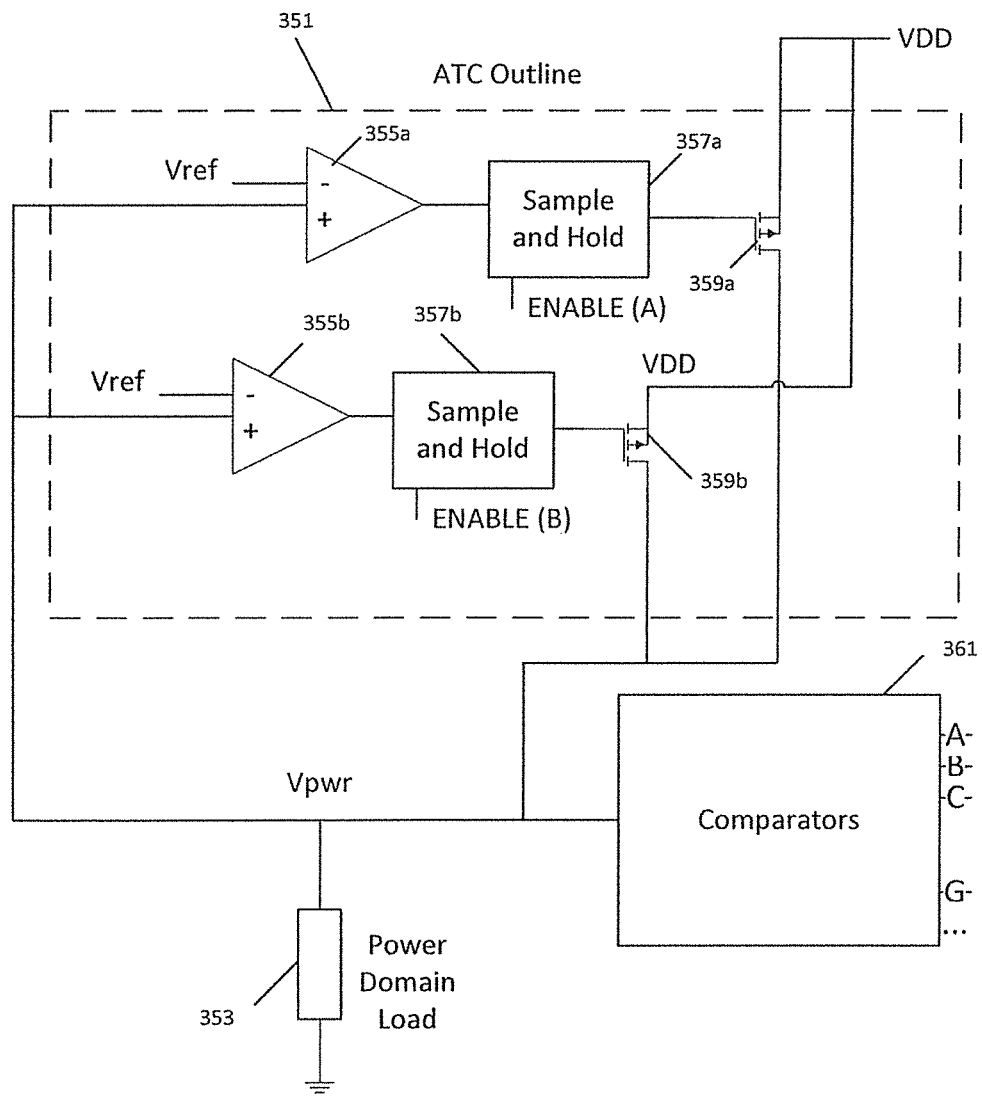
FIG. 3B is a further semi-schematic, semi-block diagram showing portions of a further embodiment of power transient circuits in accordance with aspects of the invention.

FIG. 3B is a semi-schematic of a further embodiment of portions of an active transient control block in accordance with aspects of the invention, and in some embodiments may serve, portions may serve, as the active transient control block of the embodiment of FIG. 1.

In the embodiment of FIG. 3B, an active transient control block 351 couples power from VDD to a power domain load 353. The power domain load is also coupled to power by way of a DC-DC converter, although such is not shown in FIG. 3B, and the power domain load may be provided power from the DC-DC converter, for example as discussed with respect to FIG. 3A.

The active transient control block includes a plurality of paths for providing power from VDD to the power domain load, with two paths shown in FIG. 3B for illustrative purposes. Each of the paths is gated by a switch 359a,b. Operation of each switch is based on an enable signal for that switch, and on a comparison of one or more reference voltages with voltage being applied to the power domain load. In some embodiments the reference voltages are as discussed with respect to FIG. 3A, for example. In some embodiments a signal activates a switch for a path, coupling VDD to the power domain load, when the enable signal for that switch is active and a reference voltage for that path is less than the voltage being applied to the power domain. In some embodiments the signal activating the switch is also held in the activating state for at least a preset period after activation, for example one clock cycle or a predetermined number of clock cycles.

In some embodiments the switch may operate in a range of activation, with the switch for example being one or more transistors operated in their linear range during activation. The extent of activation, and therefore magnitude of current provided by a path, may be based on a difference between the reference voltage for the path and the voltage applied to the power domain load. In addition, the activation of the switch may maintained in an active state for at least a predetermined time after activation, or for a predetermined period of time after the enable signal for that switch becomes active.

This is somewhat diagrammatically shown in FIG. 3B. In FIG. 3B a control circuitry for each path includes an analog comparator 355a,b and a sample and hold circuit 357a,b. In some embodiments the analog comparator is formed of a low gain differential amplifier or other circuitry. The analog comparator for a path compares its reference voltage with voltage applied to the power domain, and provides a signal indicative of a difference between the two to a sample and hold circuit for that path. The sample and hold circuit outputs an equivalent signal when the enable signal is active, and for a predetermined time period after the enable signal become inactive. In some embodiments the output of the analog comparator is tuned such that output voltage from the analog comparator will operate the enable switches in their linear range for a predetermined range of differences between the reference voltage and the voltage applied to the power domain load.

In some embodiments extent of activation of a switch for a path is based on a magnitude of a rate of change of a reference voltage for the path with respect to the voltage applied to the load, or in some embodiments vice versa. In some such embodiments a differentiating amplifier, for example, or a sample and hold differential amplifier may be used in control the switch for the path.

Figure 4:
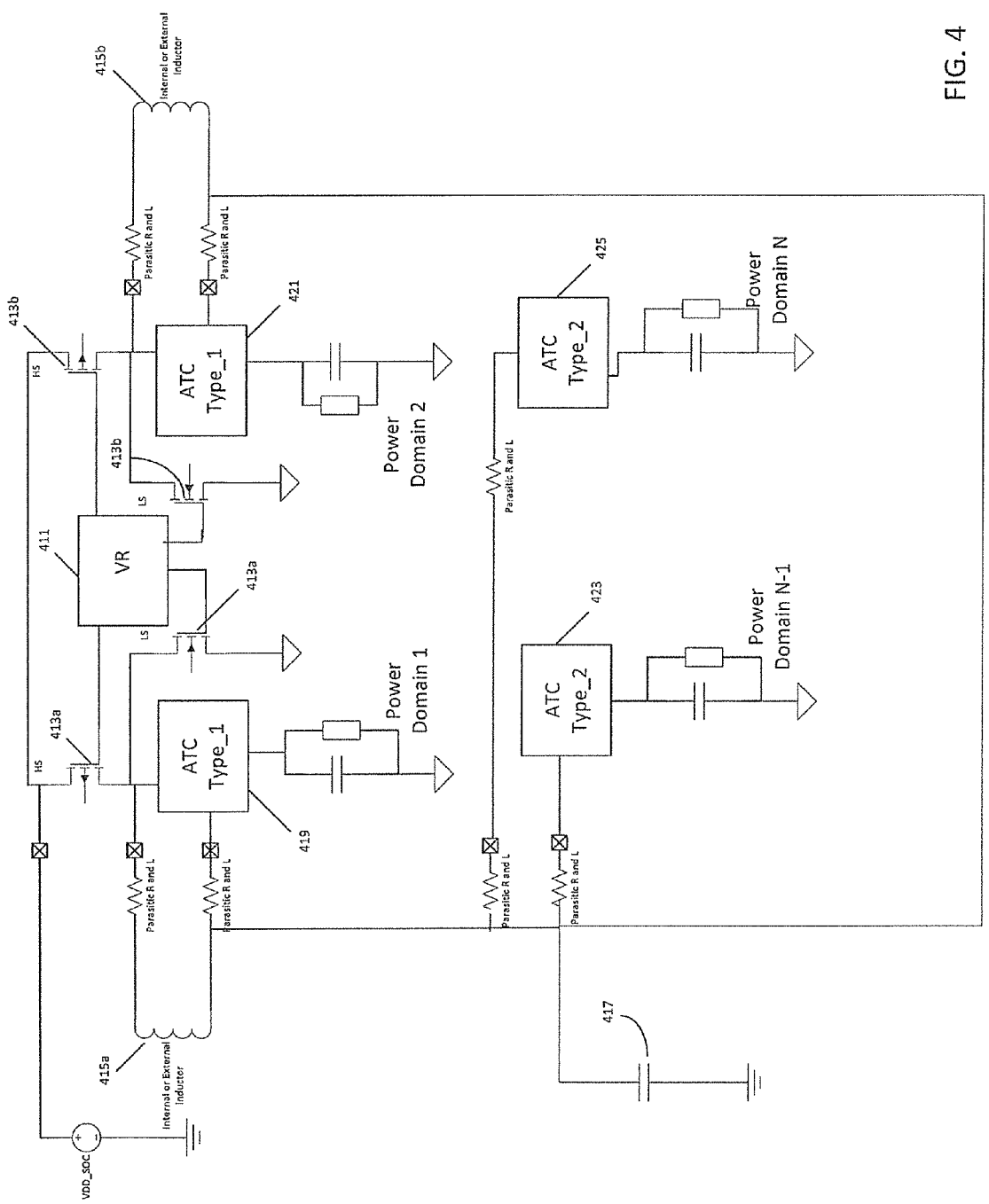
FIG. 4 is a semi-schematic, semi-block diagram showing power supply and transient control for a multiple power domain system in accordance with aspects of the invention.

FIG. 4 is a semi-schematic, semi-block diagram of a further device in accordance with aspects of the invention. In FIG. 4, multiple power domains are powered using a multiphase switching regulator 411. In FIG. 4 the switching regulator operates a first pair of switches 413a with associated inductor 415a at a first phase and a second pair of switches 413b with associated inductor 415b at a second phase. Each of the inductors is coupled to a common capacitor 417. In various embodiments more than two such sets, for example 16 such sets, may be so operated by the switching regulator. The use of such a multi-phase operation may be beneficial in maintaining capacitor voltage at a relatively stable value. In some embodiments of a multi-phase implementation when all phases are in standby; the power domains associated with a first phase that changes mode from standby to active is considered for fast startup activation, and in some such embodiments only the first phase is so considered. In this case fast startup is only activated during the first high side cycle of this phase, and consecutive phases are not considered for fast startup. During the first cycle of the first phase all power domains associated with the first phase, with ISO switch ON, can activate fast startup.

The regulator generally controls provision of power to a plurality of power domains. In the embodiment of FIG. 4, power domains 1, 2, N-1, and N are illustrated. Power domains 1 and 2 are coupled to power by way of active transient control blocks 419, 421, respectively. The active transient control blocks 419, 421 are also coupled across respective ones of the inductors. The active transient control blocks 419, 421 may be implemented, for example, as discussed with respect to FIGS. 1 and/or 2, and may implement both fast startup mode operations and forced standby modes. Power domains N-1 and N are coupled to power by way of active transient control blocks 423, 425, respectively. Active transient control blocks 423, 425 are not coupled across inductors. Active transient control blocks 423, 425 may be implemented, for example, as discussed with respect to FIGS. 1 and/or 3 (including the coupling to VCC_SOC), and implement fast startup mode but do not implement forced standby mode.

In some embodiments an SoC would indicate upcoming transients with POWERUP/POWERDN and ISOLATE control signals. In some embodiments the control signals may be used, instead or additionally to enter which will determine fast startup and fast shutdown modes, and to allow for regulator control operation based on the information obtained from these transient events. In some embodiments, in all cases, the regulator controller acting independently based on the voltage error on the external capacitor (for example +2% to forced standby, -1% to activate) can activate a phase or go to forced standby. If the regulator controller activates a first phase when all phases are in standby, all power domains with ISO switch ON can activate fast startup regardless of whether they have received POWERUP signal.

Figure 5:
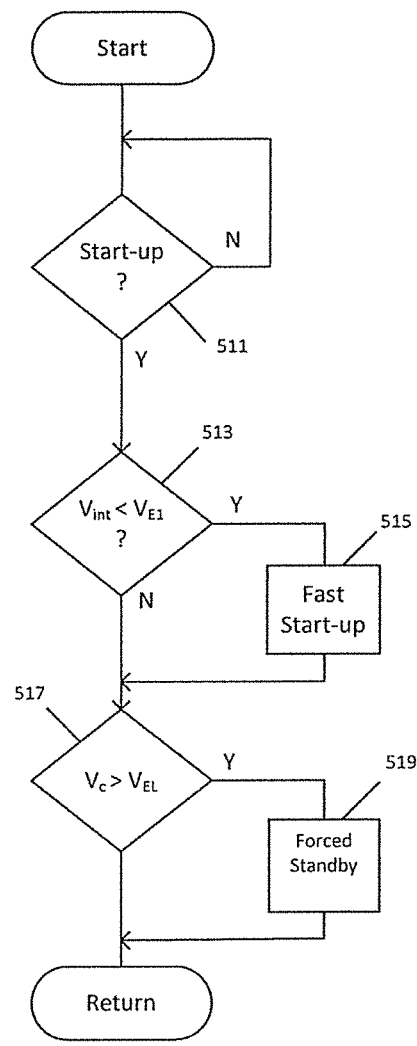
FIG. 5 is a flow diagram of a process useful in providing for transient control for supply of power in or to an integrated circuit, in accordance with aspects of the invention.

FIG. 5 is a flow diagram of an example process for determining entry to fast startup mode and forced standby mode. The process of FIG. 5 may be performed by a controller, for example implemented directly in circuitry or circuitry executing program instructions.

In block 511 the process determines if the converter has started or is in standby mode. If started (not in standby mode) the process continues to block 513. In block 513 the process determines if voltage applied to a load is less than a predetermined error threshold. If so, the process goes to block 515, and enters startup mode. Otherwise the process continues to block 517. In block 517 the process determines if capacitor voltage is greater than a predetermined error threshold. If so, the process goes to block 519, and enters forced standby mode.

In some embodiments forced standby conditions are continuously monitored, and reset when the error condition is eliminated. During forced standby the DC-DC high side switch and low side switch control signals may be determined, but the control signals disabled, for example based on a control signal from the active transient control block. In some embodiments the forced standby mode inductor current is monitored, with the mode ending when the current is below a preset threshold. The capacitor voltage may also be monitored, and if the capacitor voltage error falls below threshold (typically +1%) the forced standby mode additionally or alternatively ends.

In some embodiments forced standby conditions are continuously monitored and can be activated to handle overvoltage on the capacitor connected to multiple power domains. Each power domain can independently activate fast startup and fast shutdown.

The process thereafter returns.

Figure 7:
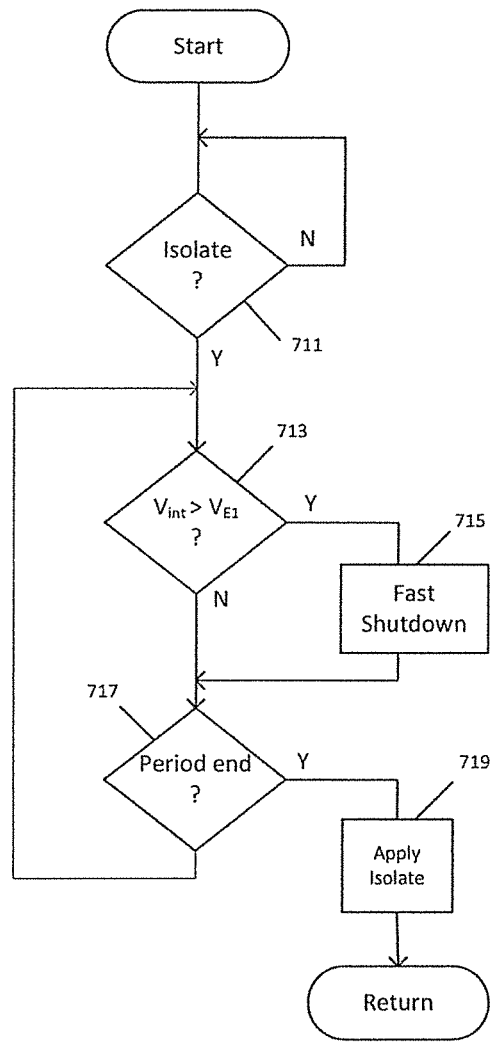
FIG. 7 is a flow diagram of a further process useful in providing for transient control for supply of power in or to an integrated circuit, in accordance with aspects of the invention.

FIG. 7 is a flow diagram of an example process for determining entry to fast shutdown mode. The process of FIG. 7 may be performed by a controller, for example implemented directly in circuitry or circuitry executing program instructions. In some embodiments fast shutdown mode occurs when there is an isolation command and a large positive internal voltage error. In some embodiments, in fast shutdown mode current mirrors, coupled to a node to which voltage is applied to power a load, are turned on based on the voltage error, to sink current to ground.

In block 711 the process determines if a command to isolate a power domain has been received. If so, the process continues to block 713 and determines if voltage applied to the power domain is above a predetermined error voltage. If so, the process enters fast shutdown mode in block 715. The fast shutdown mode may operate as discussed herein. If fast shutdown mode is entered, or if the voltage applied to the power domain is not above the predetermined error voltage, the process determines if a predetermined period has ended in block 717. In some embodiments the predetermined period is one duty cycle of a DC-DC converter. If the period is over the process continues to block 719 to turn off an isolation switch, isolating the load from power, and thereafter returns. Otherwise the process returns to block 713 to perform another voltage comparison.

Although the invention has been discussed with respect to various embodiments, it should be recognized that the invention comprises the novel and non-obvious claims supported by this disclosure.

The invention claimed is:

1. A method useful in control of power to a power domain of an integrated circuit, comprising:
 determining if circuitry of a power domain is to transition from a low power state to a higher power state;
 if the circuitry is to transition from the low power state to the higher power state:
 providing power from a first power source to the circuitry of the power domain using a DC-DC switching converter, and
 providing current from a second power source to the circuitry of the power domain on a plurality of selectable paths, with a number of selected paths of the selectable paths decreasing over time.

2. The method of claim 1, wherein the first power source and the second power source are the same power source.

3. The method of claim 1, wherein the first power source and the second power source are different power sources.

4. The method of claim 1, wherein the second power source is an inductor switching node.

5. The method of claim 1, further comprising ceasing to provide current on the plurality of selectable paths when voltage applied to the circuitry of the power domain is over a predefined voltage with respect to voltage of an output capacitor of the DC-DC switching converter.

6. The method of claim 5, wherein each of the selectable paths includes a first output branch coupled to the circuitry of the power domain and a second output branch coupled to a ground.

7. The method of claim 6, further comprising selectively configuring each of the selectable paths to provide current to either the first output branch or the second output branch based on a measure indicative of power available to the circuitry of the power domain.

8. The method of claim 7, wherein the measure indicative of power available to the circuitry of the power domain is a measure of voltage of an output capacitor of the DC-DC switching converter.

9. The method of claim 6, wherein the measure indicative of power available to the circuitry of the power domain is a measure of voltage applied to the circuitry of the power domain.

10. The method of claim 6, wherein the measure indicative of power available to the circuitry of the power domain is a measure of output voltage of an output capacitor of the DC-DC switching converter.

11. The method of claim 6, wherein each of the selectable paths includes at least one current mirror.

12. The method of claim 1, wherein the number of selected paths is based on a measure indicative of power available to the circuitry of the power domain.

13. The method of claim 12, wherein the measure indicative of power available to the circuitry of the power domain is used as an index to at least one look-up table (LUT) in selection of the number of selected paths.

14. The method of claim 13, wherein the at least one LUT comprises a plurality of LUTs, with a particular one of the LUTs selected for use based on a rate of change of the measure indicative of power available to the circuitry of the power domain with respect to a desired amount of power available to the circuitry of the power domain.

15. The method of claim 1, wherein the number of selected paths decreasing over time comprises selectively ceasing to provide current on each of the selectable paths when voltage applied to the circuitry of the power domain is over a predefined voltage with respect to voltage of an output capacitor of the DC-DC switching converter, with each path having a different predefined voltage with respect to voltage of the output capacitor.

16. The method of claim 1, wherein current is continuously provided on each of the selectable paths for no longer than a predefined period.

17. The method of claim 16, wherein the predefined period is one clock cycle of a clock.

18. The method of claim 17, wherein the clock is a clock for the DC-DC switching converter.

19. The method of claim 1, wherein the low power state is a standby state and the higher power state is an operational state.

20. Circuitry useful in controlling transients in a power distribution system, comprising:
 a DC-DC switching converter coupled to a node for applying voltage to a power domain load; and a digitally controlled current source coupled to the node for applying current to the power domain load, in parallel with the DC-DC switching converter, in a ramping manner.

21. The circuitry of claim 20, wherein the digitally controlled current source includes a plurality of current paths selectively coupling a power source to the node for applying voltage to the power domain load.

22. The circuitry of claim 21, wherein each of the current paths selectively couples the power source to the node for applying voltage to the power domain load based on an enable signal for that path and a signal indicative of difference of voltage of an output capacitor of the DC-DC switching converter and voltage applied to the power domain load.

23. The circuitry of claim 21, wherein a magnitude of current supplied by a particular current path is based on a magnitude of the signal indicative of difference of voltage of the output capacitor of the DC-DC switching converter and voltage applied to the power domain load.

24. The circuitry of claim 21, wherein a magnitude of current supplied by a particular path is based on a magnitude of a signal indicative of a rate of change of difference of voltage of an output capacitor of the DC-DC switching converter with respect to voltage applied to the power domain load.

25. A system with a power transient control circuitry comprising:
- a first switch and a second switch coupled in series between a higher power source and lower power source;
- an inductor having one end coupled between the first and second switch and another end coupled to a capacitor and a power load in parallel; and
- a first plurality of paths selectively couplable between the higher power source and the power load, each of the first plurality of paths having a switch for selectively coupling the path between the higher power source and the power load.

26. The system of claim 25, further comprising at least one comparator for comparing voltage provided to the power load with predetermined values and an isolation switch coupled between the capacitor and the power load.

27. The system of claim 25, further comprising a control circuitry, coupled to the first and second switch, to control the first and second switch based on feedback signals.

28. The system of claim 25, wherein each of the first plurality of paths passes discrete amounts of power to the power load.

29. The system of claim 27, wherein the control circuitry is configured to control the first and second switch based on a signal indicative of voltage at a node between the capacitor and the inductor.

30. The system of claim 25, further comprising a second plurality of paths selectively couplable between a node, between the first plurality of paths and the power load, and the lower power source, each of the second plurality of paths having a switch for selectively coupling the path between the node, between the first plurality of paths and the power load, and the lower power source.

31. The system of claim 30, further comprising a bypass switch selectively coupling the one end and the other end of the inductor.

32. The system of claim 31, wherein the control circuitry is configured to control the bypass switch based on at least a signal indicative of a comparison of inductor current and desired load current.

33. The system of claim 32, wherein the control circuitry is configured to close the bypass switch if the signal indicative of the comparison of inductor current and desired load current indicates that the inductor current is greater than the desired load current by a predetermined factor.

* * * * *